(12) United States Patent
Kotani et al.

(10) Patent No.: US 9,766,914 B2
(45) Date of Patent: *Sep. 19, 2017

(54) SYSTEM AND METHODS FOR REMOTE MAINTENANCE IN AN ELECTRONIC NETWORK WITH MULTIPLE CLIENTS

(71) Applicant: Fujitsu Limited, Kawasaki-shi, Kanagawa (JP)

(72) Inventors: Seigo Kotani, Kawasaki (JP); Masato Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,675

(22) Filed: May 15, 2015

(65) Prior Publication Data
US 2015/0261554 A1    Sep. 17, 2015

Related U.S. Application Data

(63) Continuation of application No. 12/879,226, filed on Sep. 10, 2010, now Pat. No. 9,059,978.
(Continued)

(51) Int. Cl.
*G06F 9/455* (2006.01)
*G06F 9/445* (2006.01)
(Continued)

(52) U.S. Cl.
CPC ............ *G06F 9/45533* (2013.01); *G06F 8/61* (2013.01); *G06F 8/65* (2013.01); *G06F 9/45558* (2013.01);
(Continued)

(58) Field of Classification Search
CPC .... G06F 17/30864; G06F 21/32; G06F 21/57; G06F 21/64; G06F 8/61; G06F 8/65; G06F 9/45533; G06F 9/45558
(Continued)

(56) References Cited

U.S. PATENT DOCUMENTS

| 5,892,900 A | 4/1999 | Ginter et al. ................ 726/26 |
| 6,148,656 A | 11/2000 | Breton .................... 73/23.31 |

(Continued)

FOREIGN PATENT DOCUMENTS

| CN | 1636414 A | 7/2005 | |
| CN | 1890638 | 1/2007 | ............ G06F 9/455 |

(Continued)

OTHER PUBLICATIONS

Chinese Office Action issued in Chinese Patent Application No. 201180014937.9, With English translation, 20 pages, Dec. 3, 2014.
(Continued)

*Primary Examiner* — Meng An
*Assistant Examiner* — Willy W Huaracha
(74) *Attorney, Agent, or Firm* — Baker Botts L.L.P.

(57) ABSTRACT

A client supported by remote maintenance in an electronic network configured to serve a plurality of clients may comprise a plurality of nodes, a first virtual machine (VM), a second virtual machine, and a virtual machine manager (VMM). The first VM may handle data associated with an external data center. The second VM may be associated with one of the plurality of nodes. The VMM may be configured to manage data transfer between the first VM and the second VM. The first VM may be configured to assess a state of the client system and identify a software update for installation on the one of the plurality of nodes. The software update may be configured to maintain identity between the data in the one of the plurality of nodes and the data center. The VMM may manage an attestation process prior to delivering or installing the software update on the client system using the first VM.

25 Claims, 7 Drawing Sheets

Related U.S. Application Data

(60) Provisional application No. 61/316,498, filed on Mar. 23, 2010.

(51) Int. Cl.

| | | |
|---|---|---|
| *G06F 21/32* | (2013.01) | |
| *G06F 21/57* | (2013.01) | |
| *H04L 9/08* | (2006.01) | |
| *H04L 9/32* | (2006.01) | |
| *H04L 29/06* | (2006.01) | |
| *H04W 12/10* | (2009.01) | |
| *G06F 21/64* | (2013.01) | |
| *G06F 17/30* | (2006.01) | |
| *H04L 29/08* | (2006.01) | |

(52) U.S. Cl.
CPC ........ *G06F 17/30864* (2013.01); *G06F 21/32* (2013.01); *G06F 21/57* (2013.01); *G06F 21/64* (2013.01); *H04L 9/0897* (2013.01); *H04L 9/3231* (2013.01); *H04L 9/3234* (2013.01); *H04L 9/3297* (2013.01); *H04L 63/068* (2013.01); *H04L 63/123* (2013.01); *H04L 67/10* (2013.01); *H04L 67/42* (2013.01); *H04W 12/10* (2013.01); *G06F 2009/4557* (2013.01); *G06F 2221/2151* (2013.01); *H04L 67/34* (2013.01); *H04L 2209/60* (2013.01); *H04L 2209/805* (2013.01)

(58) Field of Classification Search
USPC .......................................................... 718/1
See application file for complete search history.

(56) References Cited

U.S. PATENT DOCUMENTS

| | | | |
|---|---|---|---|
| 6,775,602 B2 | 8/2004 | Gordon et al. | 701/29.6 |
| 6,795,966 B1 | 9/2004 | Lim et al. | 718/1 |
| 6,965,996 B2 | 11/2005 | Hirano et al. | 713/176 |
| 7,000,114 B1 | 2/2006 | Hasebe et al. | 713/176 |
| 7,003,692 B1 | 2/2006 | Banks et al. | 714/12 |
| 7,013,392 B1 | 3/2006 | Sasaki et al. | 713/187 |
| 7,043,358 B2 | 5/2006 | Ohno et al. | 701/540 |
| 7,184,704 B2 | 2/2007 | Kliland et al. | 455/41.2 |
| 7,216,343 B2 * | 5/2007 | Das | G06F 8/65 |
| | | | 714/E11.135 |
| 7,275,081 B1 | 9/2007 | Katz et al. | 709/203 |
| 7,275,156 B2 | 9/2007 | Balfanz et al. | 713/168 |
| 7,281,133 B2 | 10/2007 | Ginter et al. | 713/176 |
| 7,353,396 B2 | 4/2008 | Micali et al. | 713/176 |
| 7,359,377 B1 | 4/2008 | Kompella et al. | 370/389 |
| 7,366,892 B2 | 4/2008 | Spaur et al. | 713/151 |
| 7,412,721 B2 | 8/2008 | Torii et al. | 726/22 |
| 7,483,438 B2 | 1/2009 | Serghi et al. | 370/401 |
| 7,571,312 B2 | 8/2009 | Scarlata et al. | 713/155 |
| 7,574,481 B2 * | 8/2009 | Moore | G06F 8/68 |
| | | | 707/999.202 |
| 7,587,595 B2 | 9/2009 | Scarlata et al. | 713/167 |
| 7,587,765 B2 | 9/2009 | Challener et al. | 726/24 |
| 7,590,867 B2 | 9/2009 | Scarlata et al. | 713/193 |
| 7,613,921 B2 | 11/2009 | Scarlata | 713/167 |
| 7,620,948 B1 | 11/2009 | Rowe et al. | 717/171 |
| 7,636,442 B2 | 12/2009 | Scarlata et al. | 380/283 |
| 7,676,229 B2 | 3/2010 | Albina et al. | 455/445 |
| 7,739,403 B1 | 6/2010 | Balakrishna et al. | 709/242 |
| 7,746,071 B2 | 6/2010 | Sakhaii | 324/309 |
| 7,781,390 B2 | 8/2010 | Singleton et al. | 510/424 |
| 7,783,471 B2 | 8/2010 | Vismans et al. | 703/26 |
| 7,804,769 B2 | 9/2010 | Tuplur et al. | 370/218 |
| 7,814,495 B1 | 10/2010 | Lim et al. | 718/104 |
| 7,814,995 B2 | 10/2010 | Clausen et al. | 175/297 |
| 7,840,801 B2 | 11/2010 | Berger et al. | 713/164 |
| 7,871,973 B1 | 1/2011 | Singleton et al. | 510/424 |
| 7,906,937 B2 | 3/2011 | Bhade et al. | 320/109 |
| 8,005,612 B2 | 8/2011 | Asahara et al. | 701/452 |
| 8,028,048 B2 | 9/2011 | Karve et al. | 709/221 |
| 8,055,822 B2 | 11/2011 | Bernstein et al. | 710/65 |
| 8,055,933 B2 | 11/2011 | Jaehde et al. | 714/4.1 |
| 8,064,605 B2 | 11/2011 | Brutch et al. | 380/277 |
| 8,065,517 B2 | 11/2011 | Cizas et al. | 713/156 |
| 8,074,262 B2 * | 12/2011 | Scarlata | G06F 21/53 |
| | | | 726/4 |
| 8,095,600 B2 | 1/2012 | Hasha et al. | 709/206 |
| 8,095,601 B2 | 1/2012 | Hasha et al. | 709/206 |
| 8,151,277 B2 | 4/2012 | Greifender et al. | 719/317 |
| 8,201,161 B2 * | 6/2012 | Challener | G06F 9/4411 |
| | | | 717/168 |
| 8,229,458 B2 | 7/2012 | Busch | 455/456.1 |
| 8,239,433 B2 | 8/2012 | Park et al. | 708/271 |
| 8,250,398 B2 | 8/2012 | Solomon et al. | 713/400 |
| 8,261,266 B2 | 9/2012 | Pike et al. | 718/1 |
| 8,326,486 B2 | 12/2012 | Moinzadeh et al. | 701/36 |
| 8,330,598 B2 | 12/2012 | Szucs | 340/540 |
| 8,341,728 B2 | 12/2012 | Kaihoko et al. | 726/16 |
| 8,364,171 B2 | 1/2013 | Busch | 455/456.1 |
| 8,437,776 B2 | 5/2013 | Busch | 455/456.1 |
| 8,447,331 B2 | 5/2013 | Busch | 455/456.1 |
| 8,495,244 B2 | 7/2013 | Bonar et al. | 709/239 |
| 8,559,977 B2 | 10/2013 | Busch | 455/456.1 |
| 8,566,236 B2 | 10/2013 | Busch | 705/39 |
| 8,799,422 B1 | 8/2014 | Qu et al. | 709/220 |
| 2002/0073135 A1 | 6/2002 | Meyer | 709/107 |
| 2002/0097878 A1 | 7/2002 | Ito et al. | 380/277 |
| 2002/0178370 A1 | 11/2002 | Gurevich et al. | 713/189 |
| 2003/0099360 A1 | 5/2003 | Hoang | 380/277 |
| 2004/0042395 A1 | 3/2004 | Lu et al. | 370/225 |
| 2004/0172574 A1 | 9/2004 | Wing et al. | 714/4 |
| 2004/0181327 A1 | 9/2004 | Tsosie | 701/36 |
| 2005/0132367 A1 | 6/2005 | Tewari et al. | 718/1 |
| 2005/0289540 A1 | 12/2005 | Nguyen et al. | 718/1 |
| 2006/0069755 A1 * | 3/2006 | Peng | H04W 8/245 |
| | | | 709/220 |
| 2006/0106806 A1 * | 5/2006 | Sperling | G06F 8/65 |
| 2006/0233182 A1 | 10/2006 | Appanna et al. | 370/401 |
| 2006/0277414 A1 * | 12/2006 | Kotani | G06F 21/32 |
| | | | 713/189 |
| 2007/0028120 A1 * | 2/2007 | Wysocki | G06F 21/10 |
| | | | 713/192 |
| 2007/0083723 A1 | 4/2007 | Dey et al. | 711/163 |
| 2007/0118879 A1 | 5/2007 | Yeun | 726/3 |
| 2007/0169083 A1 | 7/2007 | Penubolu et al. | 717/168 |
| 2007/0180448 A1 | 8/2007 | Low et al. | 718/1 |
| 2007/0180449 A1 | 8/2007 | Croft et al. | 718/1 |
| 2007/0180450 A1 | 8/2007 | Croft et al. | 718/1 |
| 2007/0186212 A1 | 8/2007 | Mazzaferri et al. | 718/1 |
| 2007/0192329 A1 | 8/2007 | Croft et al. | 707/10 |
| 2007/0198656 A1 | 8/2007 | Mazzaferri et al. | 709/218 |
| 2007/0239353 A1 | 10/2007 | Vismans et al. | 701/208 |
| 2007/0250717 A1 | 10/2007 | Kumagai et al. | 713/176 |
| 2007/0255764 A1 | 11/2007 | Sonnier et al. | 707/203 |
| 2007/0260445 A1 | 11/2007 | Vismane et al. | 703/24 |
| 2007/0300220 A1 | 12/2007 | Seliger et al. | 718/1 |
| 2007/0300221 A1 | 12/2007 | Hartz et al. | 718/1 |
| 2008/0005734 A1 | 1/2008 | Poristoin et al. | 717/168 |
| 2008/0009345 A1 | 1/2008 | Bailey et al. | 463/29 |
| 2008/0034365 A1 | 2/2008 | Dahlstedt | 718/1 |
| 2008/0148374 A1 | 6/2008 | Spaur et al. | 726/6 |
| 2008/0148411 A1 | 6/2008 | Murakami | 726/26 |
| 2008/0163209 A1 | 7/2008 | Rozas et al. | 718/1 |
| 2008/0184216 A1 | 7/2008 | Muedsam | 717/168 |
| 2008/0209016 A1 | 8/2008 | Karve et al. | 709/221 |
| 2008/0209409 A1 | 8/2008 | Van Riel et al. | 717/168 |
| 2008/0209415 A1 | 8/2008 | Van Riel et al. | 718/1 |
| 2008/0222734 A1 | 9/2008 | Redlich et al. | 726/26 |
| 2008/0244552 A1 | 10/2008 | Toeroe | 717/168 |
| 2008/0244577 A1 | 10/2008 | Le et al. | 718/1 |
| 2008/0248815 A1 | 10/2008 | Busch | 455/456.5 |
| 2008/0256320 A1 | 10/2008 | Hartwich et al. | 711/173 |
| 2008/0276301 A1 * | 11/2008 | Nataraj | G06F 8/60 |
| | | | 726/3 |
| 2008/0284470 A1 | 11/2008 | Park et al. | 327/105 |
| 2009/0055824 A1 | 2/2009 | Rychtyckyj et al. | 718/101 |
| 2009/0055826 A1 | 2/2009 | Bernstein et al. | 718/102 |

(56) References Cited

U.S. PATENT DOCUMENTS

| | | | |
|---|---|---|---|
| 2009/0077630 A1 | 3/2009 | Kaihoko et al. | 726/2 |
| 2009/0089774 A1 | 4/2009 | Lynch et al. | 717/173 |
| 2009/0100418 A1 | 4/2009 | Raman et al. | 717/170 |
| 2009/0113413 A1 | 4/2009 | Reinz | 717/173 |
| 2009/0150527 A1 | 6/2009 | Tripathi et al. | 709/221 |
| 2009/0150529 A1 | 6/2009 | Tripathi | 709/222 |
| 2009/0164994 A1 | 6/2009 | Vasilevsky et al. | 718/1 |
| 2009/0204964 A1* | 8/2009 | Foley | G06F 21/53 718/1 |
| 2009/0217244 A1 | 8/2009 | Bozak et al. | 171/124 |
| 2009/0241109 A1 | 9/2009 | Vandrgrigt et al. | 718/1 |
| 2009/0254572 A1 | 10/2009 | Redlich et al. | 707/10 |
| 2009/0288084 A1 | 11/2009 | Astete et al. | 718/1 |
| 2009/0300254 A1 | 12/2009 | Newald et al. | 710/305 |
| 2009/0313032 A1 | 12/2009 | Hafner et al. | 705/1 |
| 2009/0327648 A1 | 12/2009 | Savagaonkar et al. | 711/207 |
| 2010/0057843 A1 | 3/2010 | Landsman et al. | 709/203 |
| 2010/0070963 A1 | 3/2010 | Bae et al. | 717/171 |
| 2010/0107158 A1 | 4/2010 | Chen et al. | 718/1 |
| 2010/0115512 A1 | 5/2010 | Sakai | 718/1 |
| 2010/0124196 A1 | 5/2010 | Bonar et al. | 370/329 |
| 2010/0138830 A1 | 6/2010 | Astete et al. | 718/1 |
| 2010/0161922 A1 | 6/2010 | Sharp et al. | 711/162 |
| 2010/0292867 A1 | 11/2010 | Bhohm et al. | 701/1 |
| 2010/0306770 A1 | 12/2010 | Frank | 718/1 |
| 2011/0138441 A1 | 6/2011 | Neystadt et al. | 726/1 |
| 2011/0158088 A1 | 6/2011 | Lofstrand et al. | 370/229 |
| 2011/0173490 A1 | 7/2011 | Narayanaswamy et al. | 714/4.11 |
| 2011/0197051 A1 | 8/2011 | Mullin et al. | 713/1 |
| 2011/0214115 A1* | 9/2011 | Kuusilinna | G06F 8/65 717/171 |
| 2012/0011509 A1 | 1/2012 | Husain | 718/1 |
| 2012/0017212 A1 | 1/2012 | Twitchell | 718/1 |
| 2012/0072893 A1 | 3/2012 | Gupta et al. | 717/168 |
| 2012/0102477 A1* | 4/2012 | Kim | G06F 8/665 717/169 |
| 2014/0004825 A1* | 1/2014 | Prakash | H04W 12/06 455/411 |
| 2015/0180662 A1* | 6/2015 | Cui | H04L 9/3247 713/176 |

FOREIGN PATENT DOCUMENTS

| | | | |
|---|---|---|---|
| CN | 101621377 | 1/2010 | |
| EP | 1 195 965 | 4/2002 | H04L 29/06 |
| GB | 2 423 168 | 8/2006 | |
| JP | 2000-259421 | 9/2000 | |
| JP | 2004-094301 | 3/2004 | |
| JP | 2004-206671 | 7/2004 | |
| JP | 2006-350469 | 12/2006 | |
| JP | 2009-110224 | 5/2009 | |
| JP | 2009-12926 | 6/2009 | |
| JP | 2009-129262 | 6/2009 | |
| JP | 2009-217395 | 9/2009 | G06F 9/445 |
| JP | 2009-254052 | 10/2009 | |
| JP | 2010-061237 | 3/2010 | |
| JP | 2010-149553 | 7/2010 | |
| JP | 2010-190792 | 9/2010 | |
| WO | WO 03/098868 | 11/2003 | |
| WO | WO 2009/001447 | 12/2008 | |
| WO | WO 2009/122530 | 10/2009 | |

OTHER PUBLICATIONS

European Office Action; Application No. 11 707 967.3; 4 pages, Nov. 4, 2014.

European Office Action; Application No. 11 708 365.9; 5 pages, Nov. 4, 2014.

STIP Search Results from U.S. Appl. No. 13/053,670; 43 pages, May 20, 2014.

Chinese Office Action and English Translation; Application No. 201110276927.4; pp. 15, Sep. 2, 2014.

Chinese Office Action and English Translation; Application No. 201180014465.7; pp. 25, Jun. 27, 2014.

Chinese Office Action and English Translation; Application No. 201180015119.0; pp. 14, Jun. 5, 2014.

Chinese Office Action and English Translation; Application No. 201110276927.4; pp. 8, Jan. 6, 2014.

Japanese Office Action with English translation; Application No. 2013-501278; pp. 4, Dec. 3, 2013.

Japanese Office Action with English translation; Application No. 2013-501279; pp. 4, Dec. 3, 2013.

FlexRay consortium, Requirements Specification Version 2.1, Dec. 19, 2005.

International Search Report and Written Opinion; PCT/US2011/026573; pp. 15, Jul. 1, 2011.

Makowitz et al., "FlexRay—A Communication Network for Automotive Control Systems", IEEE Computer Society; pp. 207-212, Jun. 28, 1905.

Berger et al., "TVDc: Managing Security in the Trusted Virtual Datacenter", ACM SIGOPS Operating Systems Review; XP002636435; pp. 40-47, Jun. 30, 1905.

van Cleeff et al., "Security Implications of Virtualization: A linterature Study", 2009 International Conference on Computational Science and Engineering, pp. 353-358, Jul. 1, 1905.

Nilsson et al; "A Framework for Self-Verification of Firmware Updates over the Air in Vehicle ECUs", 2008 IEE GLOBECOM Workshops, pp. 1-5, Jun. 30, 1905.

International Search Report and Written Opinion; PCT/US2011/026575; pp. 14, May 26, 2011.

International Search Report and Written Opinion; PCT/US2011/026576; pp. 13, Jun. 6, 2011.

International Search Report and Written Opinion; PCT/US2011/026577; pp. 13, Jun. 9, 2011.

Chinese Office Action issued in Patent Appl. No. 201180015119.0, w/ English Translation, 15 pages, Feb. 16, 2015.

Japanese Office Action issued in Patent Appl. No. 2011-196651, w/ English Translation, 5 pages, Jan. 27, 2015.

Chinese Office Action and English Translation; Application No. 201180014465.7; 22 pages, Mar. 18, 2015.

Chinese Office Action, Application No. 201180015119.0; with translation; 14 pages, Mar. 10, 2016.

Japanese Office Action, Application No. 2013-501277; with translation; 4 pages, Feb. 12, 2014.

Japanese Office Action, Application No. 2013-501277; with translation; 6 pages, Oct. 14, 2014.

Japanese Office Action, Application No. 2013-070511; with translation; 7 pages, Sep. 13, 2016.

\* cited by examiner

SYSTEM AND METHODS FOR REMOTE MAINTENANCE IN AN ELECTRONIC NETWORK WITH MULTIPLE CLIENTS

RELATED APPLICATIONS

This application is a Continuation of U.S. patent application Ser. No. 12/879,226 filed Sep. 10, 2010, which claims the benefit of U.S. Provisional Application No. 61/316,498 filed on Mar. 23, 2010, which are incorporated herein in their entirety.

TECHNICAL FIELD OF THE INVENTION

The present invention relates generally to information exchange and, more particularly, to a method and system for remote maintenance of an information handling system with improved safety and security.

BACKGROUND

Distributed communication networks include a wide range of systems, from private intranets to the unsecured Internet. In any communication network, electronic content flows from one point in the network to another. Electronic content, in this context, may include electronic documents, executable files, data files, etc. In some communication networks, access to the electronic content may be restricted and/or limited to particular users and/or clients. Several methods exist to verify the identity of a user attempting to gain access to electronic content, such as username and password combinations, public/private key combinations, and/or biometrics. In some networks, a central server may employ such methods before distributing electronic content to a requesting user and/or client.

Software exchange between service providers and clients may be improved by certifying the content and security of the data exchanged. Some systems for certification are difficult to implement for a variety of reasons. For example, it may be difficult to protecting scanning and reporting agents within an operating system. As another example, the size of a client system may require too much time to complete a scan and/or transmit a report due to size. As another example, some systems may not be able to provide a secure connection between a biometric sensor and the reporting agent. Improved certification methods and systems may improve security, speed, and/or efficiency of software exchange between service providers and clients.

SUMMARY OF THE DISCLOSURE

The present disclosure provides a method and system for distributing electronic content that substantially eliminates or reduces at least some of the disadvantages and problems associated with previous methods and systems.

According to one embodiment, a client supported by remote maintenance in an electronic network configured to serve a plurality of clients may comprise a plurality of nodes, a first virtual machine (VM), a second virtual machine, and a virtual machine manager (VMM). The first VM may handle data associated with an external data center. The second VM may be associated with one of the plurality of nodes. The VMM may be configured to manage data transfer between the first VM and the second VM. The first VM may be configured to assess a state of the client system and identify a software update for installation on the one of the plurality of nodes. The software update may be configured to maintain identity between the data in the one of the plurality of nodes and the data center. The VMM may manage an attestation process prior to delivering or installing the software update on the client system using the first VM.

According to another embodiment, an electronic network providing remote maintenance to a plurality of clients may comprise a client system, an external data center, a processor, a first VM and a second VM hosted on the client system, and a VMM. The client system may include a plurality of nodes. The external data center may manage data associated with the plurality of nodes. The first VM may handle data associated with the external data center. The second VM may be associated with one of the plurality of nodes. The VMM may be configured to manage data transfer between the first VM and the second VM. The first VM may be configured to assess a state of the client system and identify a software update for installation on the one of the plurality of nodes. The software update may be configured to maintain identity between the data in the one of the plurality of nodes and the corresponding data managed by the data center. The VMM may manage an attestation process prior to delivering or installing the software update on the client system using the first VM.

According to another embodiment, a method for performing remote maintenance in an electronic network configured to serve a plurality of clients may comprise operating a data center, communicating with a first VM hosted by the client system, receiving a request from the first VM, performing an attestation process, sending the identified software update, and authorizing the first VM to install the identified software. The data center may have a database of software associated with various nodes in a client system. The first VM may be hosted by the client system and handle a first data set associated with the data center. The request from the first VM may identify a software update for delivery to one of the various nodes in the client system. The identified software update may be sent to the first virtual machine using a closed network. The first VM may install the identified software update on the client system using a second VM associated with the one of the various nodes. The first VM and the second VM may communicate through a virtual machine manager.

According to another embodiment, a method for a client system to request and receive software updates from a remote server may comprise hosting two VMs associated with the client system, operating a VMM, recognizing a first data set is out of identity with a second data set, identifying a software update for delivery to the node, performing an attestation process verifying the identity of the client system, requesting the identified software update from the external data center, receiving the identified software update from the external data center to the first VM, and installing the sent software update on the node through the second virtual machine. The VMM may be configured to manage communication between the two VMs. The first VM may handle a first data set associated with an external data center. The second VM may handle a second data set associated with a node in the client system. The first VM and the second VM may communicate through a virtual machine motor. The software update configured to restore identity between the first data set and the second data set.

Technical advantages of certain embodiments of the present disclosure include providing methods for allowing direct transfer of electronic content between clients without connecting both clients to a server. The methods may include checking and/or authorizing the transfer based on characteristics of the respective clients. The methods may include tracking and/or tracing the transfer of electronic content after it has been delivered from the server. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
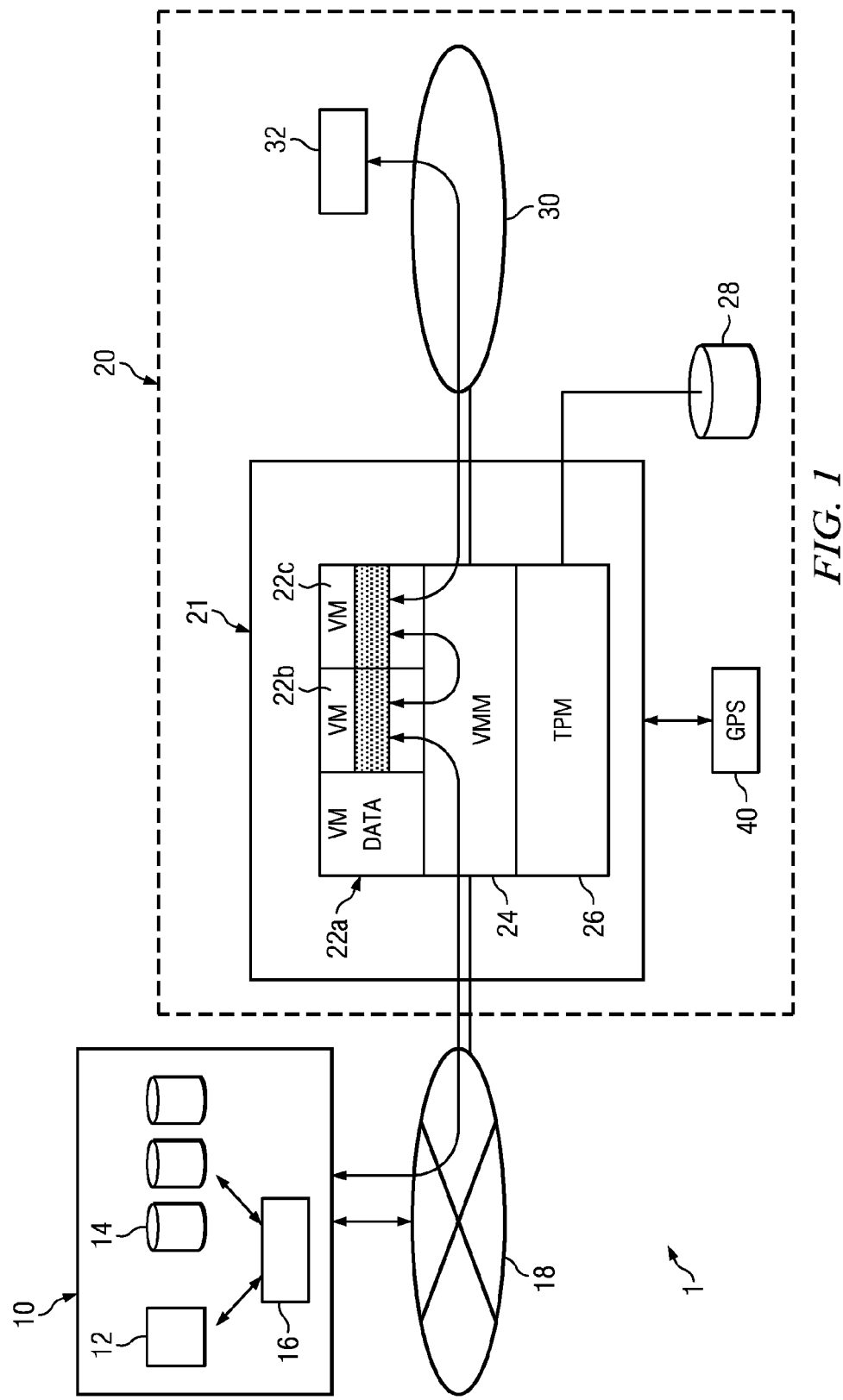
FIG. 1 shows an example communication network, including a client system and an external data center, in accordance with teachings of the present disclosure.
Figure 2:
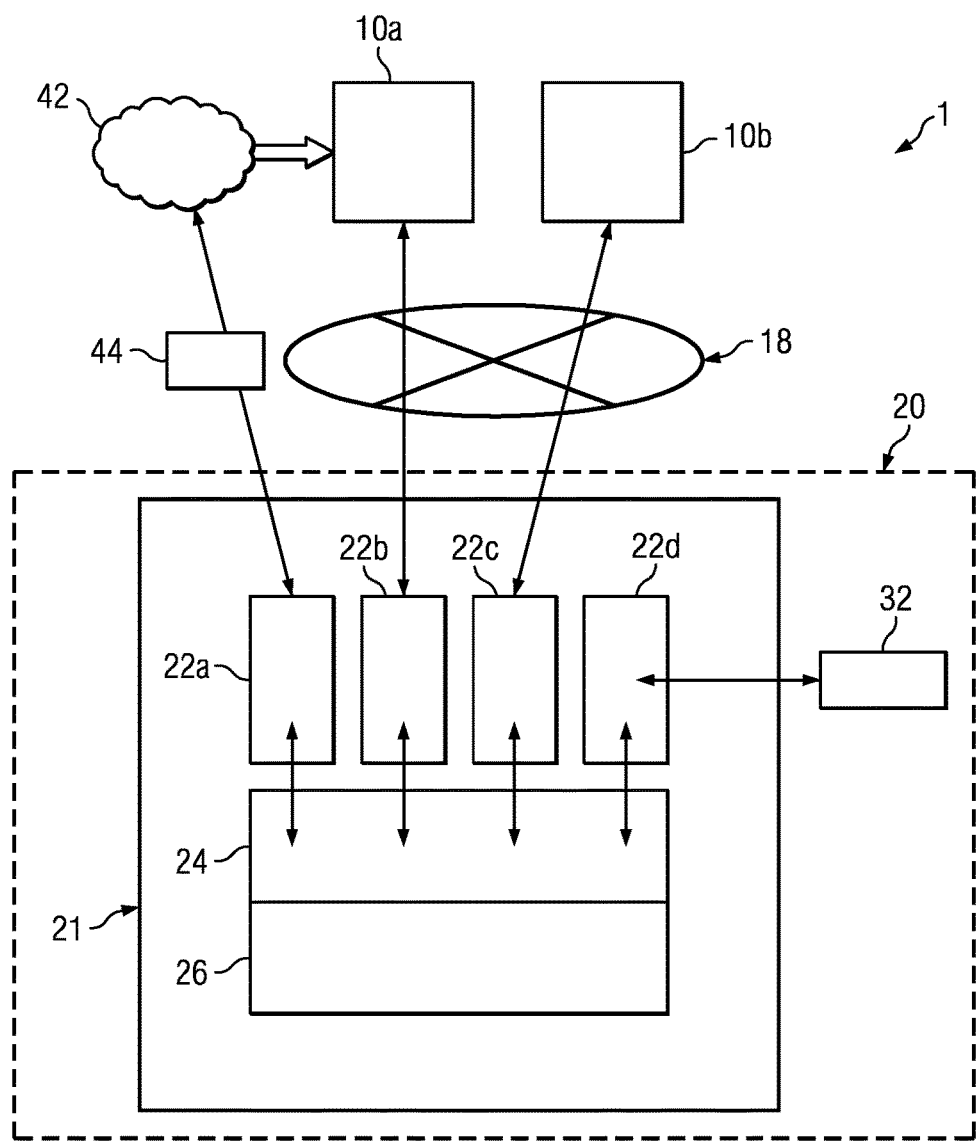
FIG. 2 shows an example communication network, including an example client system and external data center, in accordance with teachings of the present disclosure.
Figure 3:
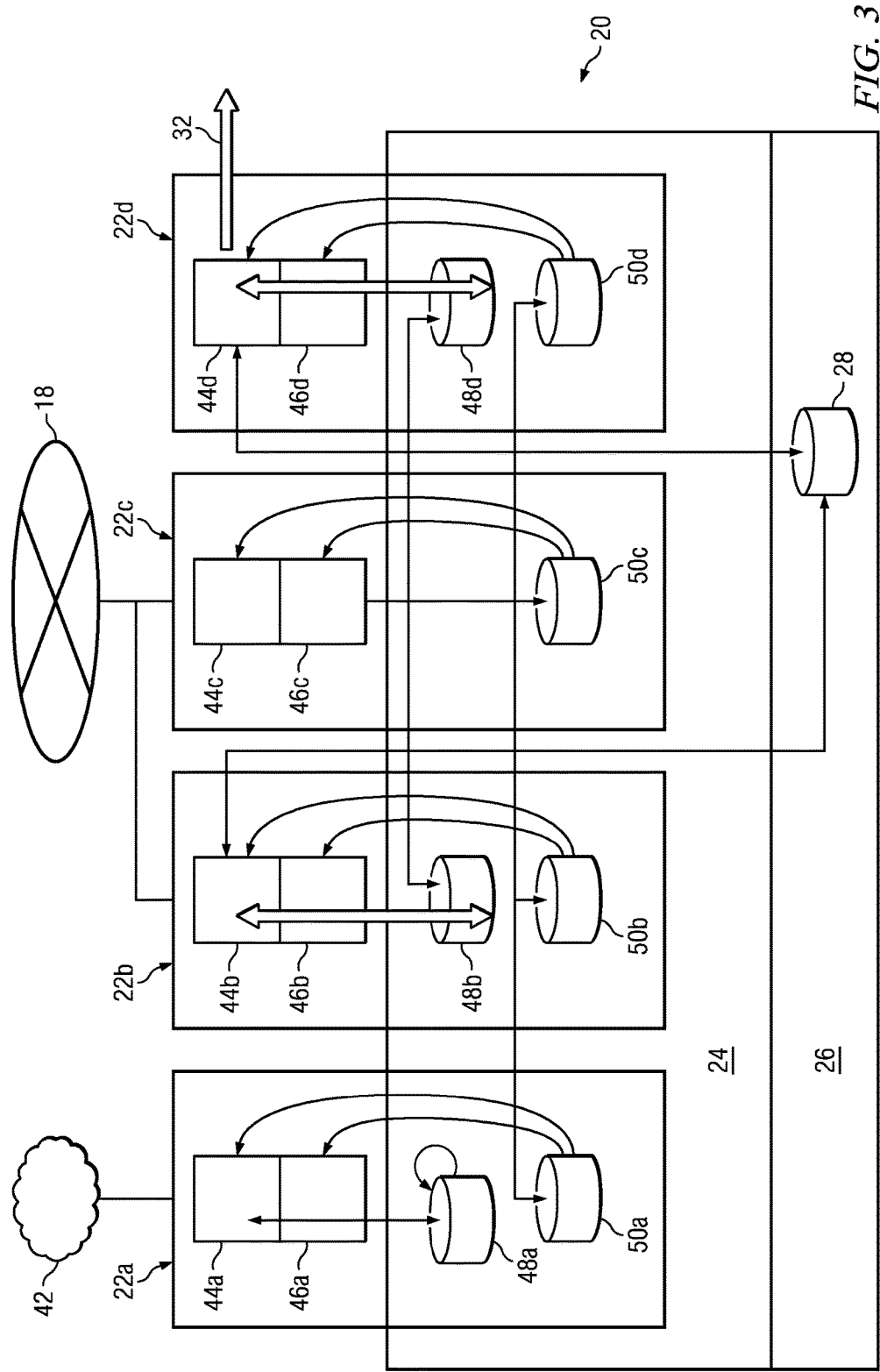
FIG. 3 shows an example communication network, including details of a client system, in accordance with teachings of the present disclosure.

Preferred embodiments and their advantages are best understood by reference to FIGS. 1 through 11, wherein like numbers are used to indicate like and corresponding parts. FIG. 1 shows a simplified representation of an example electronic network 1, in accordance with the teachings of the present disclosure. Electronic network 1 may include a data center 10 and a client system 20. Some embodiments of electronic network 1 may include numerous clients and their respective client systems. In FIGS. 1-3, a single client and its client system 20 is shown and discussed for the sake of clarity.

Data center 10 may be configured to provide maintenance to various clients and/or client systems 20. Such maintenance may include managing software and/or firmware updates and/or status. In complicated electronic networks with many client systems 20, managing the delivery of electronic content to various client systems 20 may be even more difficult if reports must be certified and/or verified.

For purposes of this disclosure, "electronic content," "content," "software," and/or "software updates" may include any file, files, object code, executable code, data records, or any other electronically recorded data structure that a client of an electronic network may wish to access. Illustrative examples may include text files, spreadsheets, email, medical records, images, and other electronic data, as well as web pages, private networks, word processing programs, file management systems, and other programs. Additionally, a "client" may refer to a person acting as an end user or to the device or devices used by such a person to access the communication network, such as a personal computer, kiosk, or mobile computing device.

Trusted Computing and TrustCube may provide certifiable reporting related to client systems 20 to a service provider (e.g., data center 10). Certifiable reporting may create difficulty in protecting scanning and/or reporting agents associated with the client systems 20. In addition, the time required to complete a scan and send a large associated report may be too large. As another example, it may be difficult to implement a biometric sensor to the client system 20 and its reporting agent.

In some embodiments of the present invention, the combination of virtual machine (VM) technology and trusted computing techniques may provide advantages over other methods. For example, using a first VM with a minimal operating system (OS) for the limited purpose of generating reports may provide protection for the rest of the client system 20 against external access. As another example, because the first VM uses a smaller number of files and the files are smaller, the size of the reports sent to the data center 10 may be reduced. The advantages can be increased by using virtual hard disk images and virtual memory images instead of individual files in hard disk partitions. As another example, a limited purpose OS may repeatedly use the same files and/or memory images and changes to those files and images may be discarded and/or deleted.

In some embodiments, VM technology may be combined with file storage techniques (e.g., mbox). For example, files may be stored in plain text format in a single file. Such techniques may allow text processing tools to be readily used on the contents.

A virtual machine manager (VMM) may create, run, monitor, and/or terminate various VMs. The VMM may function to intercept interrupts and/or faults between VMs and/or to control the access that an application has to a hardware device and/or installed software. A VMM may also manage multi-tasking for a processor by sharing time between various threads in which applications and/or VMs run. Use of a VMM may expand the functionality of the VMs described above.

As another example, biometric sensors may be incorporated using separate VM and connected to the first VM through a VMM. The data center 10 may use certifiable reporting techniques in combination with biometric data to evaluate the trustworthiness of the state of the client system 20 and/or the biometric data.

Data center 10 may include processor 12, storage resources 14, and a communication bus 16. Processor 12 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in storage resources 14, and/or another component of data center 10.

Data center 10 may represent a trusted, dedicated server that manages security policies and authenticates attributes. Data center 10 may contain a database containing a number of policies defining a set of attribute values that must be met before a client system 20 is granted permission to access electronic content and/or software. Data center 10 may receive an attribute report from client system 20 identifying one or more attributes associated with client system 20. After authenticating the attributes, data center 10 may determine whether to provide the requested service to client system 20. Application of such attribute report and authentication may also be referred to as "policy-based management." The context data may include data representative of client system 20 such as physical location (e.g., IP address), certain software installed on the requesting machine (e.g., rigorous antivirus software), biometric identifiers, or any other appropriate context attributes of client system 20.

Storage resources 14 may be communicatively coupled to processor 12 and may comprise any system, device, or apparatus operable to retain program instructions or data for a period of time (e.g., computer-readable media). Storage resources 14 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to storage resources 12 is turned off.

Storage resources 14 may include any combination of hardware and software, including controlling logic. For example, storage resources 14 may include a centralized repository of documents, such as medical records. As another example, storage resources 14 may represent an application service provider which provides access to particular applications, software or other media over a network. Such applications, software, or media may include, among other things, document readers, web browsers, or document editing software. As another example, storage resources 14 may be associated with an online networking website or an Email provider.

For clarity of description, FIG. 1 depicts processor 12 and storage resources 14 as separate components. In some embodiments, processor 12 and storage unit 14 may include stand-alone software programs stored on computer-readable media and executable by one or more processors associated with one or more computers and/or servers. However, processor 12 and storage unit 14 may also include components or subroutines of a larger software program, hard-coded into computer-readable media, and/or any hardware or software modules configured to perform the desired functions.

Communication bus 16 may be any suitable system, apparatus, or device operable to serve as an interface between data center 10 and network 18. Communication bus 16 may enable data center 10 to communicate over network 18 using any suitable transmission protocol and/or standard, including without limitation all transmission protocols and/or standards enumerated below with respect to the discussion of network 18. In some embodiments, network 18 may be a closed network (e.g., network 18 is only accessible by authorized clients).

As illustrated, network 18 may include any network capable of transmitting audio and/or video telecommunication signals, data, and/or messages. Some examples may include all, or a portion of, a radio access network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any combination of the preceding.

In operation, network 18 may provide connectivity between components coupled to network 18 using any appropriate communication protocol. To facilitate the described communication capabilities, network 18 may include routers, hubs, switches, gateways, call controllers, and/or any other suitable components in any suitable form or arrangement. Additionally, network 18 may include any hardware and/or software configured to communicate information in the form of packets, cells, frames, segments or other portions of data. Although network 18 is illustrated as a single network, communication network 18 may comprise any number or configuration of networks. Moreover, certain embodiments of communication network 1 may include any number or configuration of network 18.

In some embodiments, network 18 may include a virtual private network (VPN). A VPN provides increased security over an open and/or public network. In general, a VPN segregates and/or encapsulates data transfers so that the data may be kept private and/or secure from other devices sharing a intervening network (e.g., a LAN or a WAN). In operation a VPN may allow a plurality of clients 20 to interact with data center 10 as if connected directly and/or privately.

Client 20 may include any system and/or component of electronic network 1 maintained, at least in part, by data center 10. Client 20 may include multiple processors, related software and/or firmware, sensors, etc. For example, client 20 may include an automobile and its internal network. As another example, client 20 may include a portable phone with processors and software identity modules (SIM) cards. In the context of this disclosure, client 20 may be described with respect to specific embodiments, by the teachings are not so limited. In some embodiments, the various processors and storage resources associated with client 20 may be provided by multiple vendors and/or service providers. In those embodiments, maintenance of the various processors and their associated software and/or firmware may be complicated by the need to coordinate data across the multiple vendors and/or service providers. Rather than allow unfettered access to the entire client system 20, the teachings of this disclosure may allow for virtual partitions segregating the various resources from one another.

Client 20 may include a computer and/or a computing device including functionality for wireless communication with data center 10. For example, client 20 may include a desktop computer, a laptop computer, a personal digital assistant (PDA), a smart phone, a cellular or mobile phone, an in- or out-of-car navigation system, and/or a mobile gaming device. Client 20 may operate one or more client applications (e.g., a web browser, a text editor, etc.).

FIG. 1 shows an example client system 20 including a processing module 21, multiple VMs 22, a VMM 24, a trusted platform module (TPM) 26, a resource list 28, an client network system 30, a node 32, and a GPS interface 40. Some embodiments may provide increased security of a VM 22 by creating multiple VMs 22 and controlling the information flow between them using a VMM 24.

Client system 20 may be significantly more complex than the simplified client network system 30 shown in FIG. 1. For example, an automobile may include a client network system 30 (e.g., FlexRay) including multiple processors, in some examples several hundred processors. In FIG. 1, node 32 represents a single processor and/or another resource associated with client network system 30.

VM 22 may include a virtual machine corresponding to client network system 30 and/or to a single process associated with client network system 30. Multiple VMs 22 may run multiple operating systems (OS). In such an arrangement, each VM 22 may use a single-purpose OS and time-share any needed processing resources of client system 20 and/or processing module 21 through VMM 24.

Trusted platform module 26 may include resources configured to generate cryptographic keys (e.g., a hardware pseudo-random number generator). In some embodiments, TPM 26 may include remote attestation and/or sealed storage. In some embodiments, TPM 26 includes at least one dedicated processor with a unique and secret RSA key assigned to and burned into the processor chip during manufacturing. Use of a unique RSA key in TPM 26 may allow data center 10 to verify that client system 20 is actually a client.

For example, TPM 26 may employ a hash key including a summary of the hardware and software configuration of client system 20. A hash key may allow client system 20 to test any incoming software packages and/or updates to verify they have not been changed. One example verification method includes binding, encryption based on a TPM endorsement key unique to a processor during its manufacture and/or another trusted key related to that endorsement key. Another example verification method includes sealing, which may impose an additional state requirement on the condition of the TPM 26.

Resource list 28 may include a list and/or register of entities. In some embodiments, resource list 28 may include a whitelist of entities approved for access and/or recognition. A whitelist may include any data center 10 entities that TPM 26 may approve for access to client system 20. In some embodiments, resource list 28 may include a blacklist of entities for which access will be denied.

Client network 30 may include a network system within a particular client, including multiple processors and/or storage resources. For example, client network 30 may include a FlexRay network system associated with an automobile. FlexRay is a particular embodiment of a network communications protocol developed for managing the numerous processors in an automobile system. As another example, a controller-area network (CAN or CAN-bus) is a particular embodiments of a communications protocol standard designed to allow microcontrollers and devices to communicate with each other without a host computer. Additional examples include time triggered protocol (TTP) and avionics full-duplex switched ethernet (AFDX).

Node 32 in client system 20 may include any particular resources of client system 20. For example, node 32 may include processors and/or their associated software, firmware, and/or processing instructions related to the processors. For example, an automobile may have a very complex network system comprising multiple CPUs. Each CPU may have software and/or firmware for its operation supplied by the vendor. Client network 30 may be responsible for the operation and/or maintenance of each node 32, including managing the version and/or update status of the software and/or firmware associated with each node 32 in client system 20.

Global positioning system interface 40 may include any interface with the Global Positioning System (GPS). GPS includes a space-based global navigation satellite system providing reliable location and time information. GPS is accessible by anyone and/or any system with a GPS receiver. The use of particular and accurate location and/or timing information may allow client processing module 21 to manage information requests, downloads, and/or other content.

FIG. 2 shows an example communication network 2, including an example client system 20 and external data centers 10*a* and 10*b*, in accordance with teachings of the present disclosure. Data centers 10 may include any external data base accessible by client system 20. For the purposes of illustration only, one example client system 20 is described in relation to FIG. 2, where client system 20 comprises a mobile navigation system. The teachings of the present disclosure may be used with any appropriate client system 20.

Communication network 2 may include internet 42, external data centers 10, and client mobile navigation system 20. Client system 20 may communicate with internet 42 through a private infrastructure 44 (e.g., a home-based internet connection in a user's home). Data centers 10*a* and 10*b* may communicate with client system 20 through network 18. Network 18 may provide secure communications as described in this disclosure.

Data center 10*a* may include a database of electronic content useful in client system 20. For example, if client system 20 includes a mobile navigation system, data center 10*a* may include maps, updated interfaces for the user, and other content related to a mobile navigation system. Data center 10*a* may also communicate with internet 42 via an ISP.

Data center 10*b* may include a database housing firmware, maintenance, and software related to the operation of mobile navigation system 20. For example, data center 10*b* may provide a list of the most current versions of firmware for each processor in mobile navigation system 20.

Client system 20 may operate several VMs 22 in module 21 to interface with each separate data source. For example, VM 22*a* may include a universal browser and/or a web OS for interaction with internet 42. As another example, VM 22*b* and 22*c* may include a private application and a virtual OS for interaction with data centers 10*a* and 10*b*, respectively. As another example, VM 22*d* may include a private application and a virtual OS for interaction with various systems in the user's automobile 32.

Each VM 22 may only communicate to another VM 22 through VMM 24. VMM 24 may manage these communications in concert with TPM to increase the security of each VM 22. For example, content received from the internet 42 may not be installed to node 32 unless approved by VMM 24 by any of the various methods described herein.

FIG. 3 shows details of example communication network 2, including details of client system 20, in accordance with teachings of the present disclosure. FIG. 3 shows that VMM 24 be responsible for environment management of each VM 22. Each VM 22 may include an associated application 44 operated by an OS 46. VMM 24 may provide storage resources 48 to various VMs 22 as appropriate. VMM 24 may operate one or more programs 50 in association with each VM 22. VMM 24 may also cooperate with TPM 26 and/or resource list 28 to provide encryption, validation keys, white lists, and/or black lists.

Figure 4:
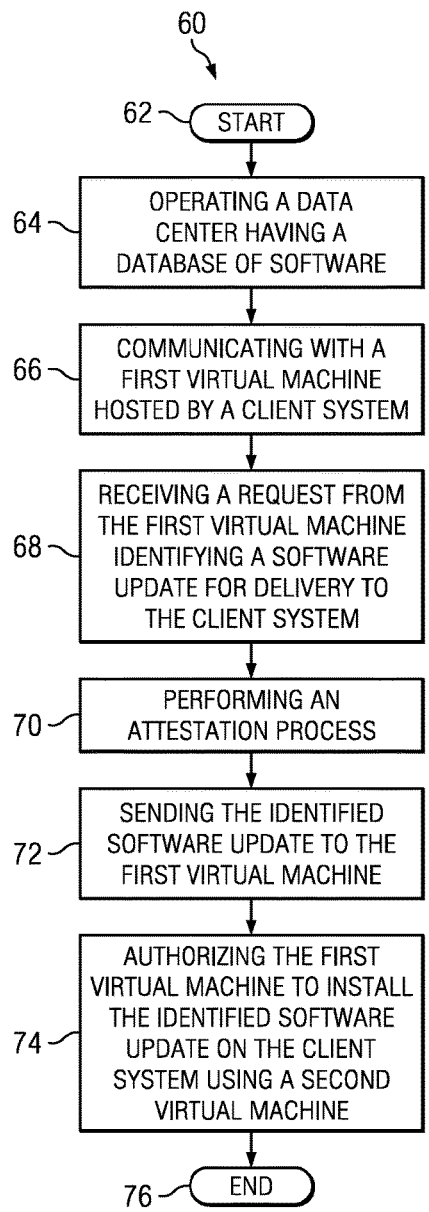
FIGS. 4-11 show flowcharts depicting various methods for remote maintenance of an information handling system with improved safety and security.

FIG. 4 illustrates a flow chart of an example method 60 for performing remote maintenance in an electronic network configured to serve a plurality of client systems 20, in accordance with certain embodiments of the present disclosure. Method 60 may include multiple steps and may be performed by various components of electronic network 1, including data center 10 and/or other resources. Method 60 may start at 62. In some embodiments, client system 20 may include an automobile and/or an FlexRay system associated with an automobile.

Step 64 may include operating a data center 10 having a database of software associated with various processors and resources in a client system. For example, step 64 may include maintaining a list of processors associated with client system 20, as well as any current software and/or firmware provided for the use of the processors of client system 20.

Step 66 may include communicating with a first virtual machine 22*b* hosted by processing module 21 of client system 20. First virtual machine 22*b* may handle a first data set associated with the data center 10. First virtual machine 22*b* may be managed by VMM 24 as discussed above. First virtual machine 22*b* may be configured to monitor the list of processors and their associated software and/or firmware maintained by data center 10.

Step 68 may include receiving a request from first virtual machine 22b identifying a software update for delivery to client system 20. For example, data center 10 may receive such a request from first virtual machine 22b through network 18.

Step 70 may include performing an attestation process verifying the identity of client system 20. An attestation process may include any of the verification processes discussed above. In some embodiments, an attestation process may include receiving, testing, and/or verifying one or more biometric indicators. In some embodiments, data center 10 may perform the attestation process to verify the identity of client system 20.

Step 72 may include sending the identified software update to first virtual machine 22b using a network 18. Network 18 may be a closed network as discussed above. In some embodiments, data center 10 may perform step 72. In some embodiments, the identified software update may be sent wirelessly.

Step 74 may include authorizing first virtual machine 22b to install the identified software update on client system 20 using second virtual machine 22c associated with the client system. In some embodiments, data center 10 may perform step 74. In other embodiments, VMM 26 may perform step 74. Method 60 may end at 76.

Method 60 may be useful on client systems 20 where first virtual machine 22b and second virtual machine 22c communicate through VMM 24. Use of VMM 24 may protect client system 20 from direct access by data center 10 and/or otherwise increase security of the components of client system 20. In some embodiments of method 60 first virtual machine 22b may interrogate second virtual machine 22c to verify client system 20 has successfully installed the software update.

In client systems 20 with a large number of nodes 32, traditional methods of maintenance would require client system 20 to be serviced at a secure maintenance location. Remote maintenance by radio transmission and/or another over-the-air system may decrease security under those traditional methods.

In contrast, electronic networks 1 employing method 60 may allow the use of remote maintenance without decreasing security. Particular embodiments of electronic network 1 may increase the security of any particular VM 22 by managing the VMs 22 with VMM 24, where data exchange between the various VMs 22 may be operated and/or controlled by VMM 24.

Figure 5:
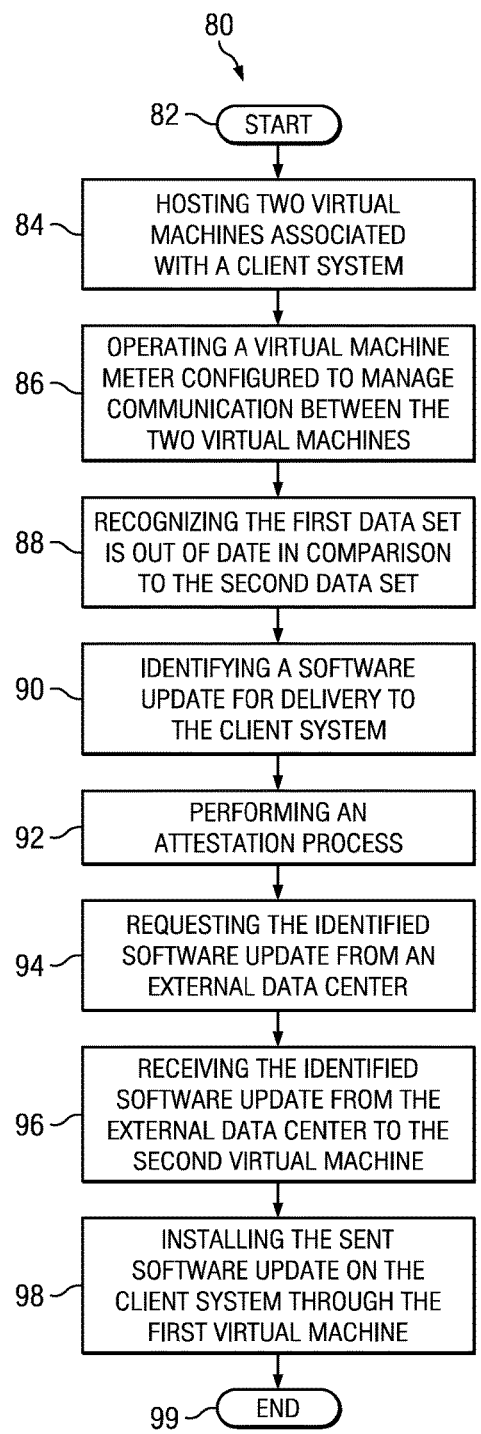

FIG. 5 illustrates a flow chart of an example method 80 for a client system 20 to request and receive software updates from a remote server, in accordance with certain embodiments of the present disclosure. Method 80 may include multiple steps and may be performed by various components of electronic network 1, including processor module 21 of client system 20 and/or other resources. In some embodiments, client system 20 may include an automobile and/or an FlexRay system associated with an automobile. Method 80 may start at 82.

Step 84 may include hosting two VMs 22 associated with client system 20. First VM 22b may handle a first data set associated with the client system 20. Second VM 22c may handle a second data set associated with an external data center 10.

Step 86 may include operating a VMM 24 configured to manage communication between the two virtual machines 22. Use of VMM 24 may protect client system 20 from direct access by data center 10 and/or otherwise increase security of the components of client system 20.

Step 88 may include recognizing the first data set is out of date in comparison with the second data set. Step 88 may be performed by a VM 22. For example, second VM 22b may interrogate first VM 22c to check the status, version, and/or configuration of any processors and/or their respective software and/or firmware. For example, second VM 22b may compare the status, version, and/or configuration of a particular processor and/or its respective software and/or firmware against the updated data in data center 10.

Step 90 may include identifying a software update for delivery to client system 20. Step 90 may be performed by a VM 22, data center 10, and/or other components of electronic network 1. In some embodiments, VM 22 may transmit data related to client system 20 to data center 10 via a secure mechanism (e.g., via TPM/TNC).

Step 92 may include performing an attestation process verifying the identity of the data center 10. An attestation process may include any of the verification processes discussed above. In some embodiments, an attestation process may include receiving, testing, and/or verifying one or more biometric indicators. In some embodiments, client system 20 may perform the attestation process to verify the identity of data center 10 using second VM 22b, TPM 24, and/or resource list 28.

Step 94 may include requesting the identified software update from the external data center 10. In some embodiments, second VM 22b may perform step 94. The identified software update may include various software and/or firmware related to one or more nodes 32 of client system 20 (e.g., a CPU).

Step 96 may include receiving the identified software update from the external data center 10 to the client system 20. In some embodiments, second VM 22b will perform step 96. The identified software update may be transmitted over network 18. In some embodiments, VMM 24 may check the received software update for integrity before performing step 98.

Step 98 may include installing the sent software update on client system 20 through first virtual machine 22b. In some embodiments of method 80 second virtual machine 22b may interrogate first virtual machine 22c to verify client system 20 has successfully installed the software update. In some embodiments, client system 20 may create and/or maintain a log for the receipt and/or installation of the software updates. In some embodiments, data center 10 may create and/or maintain a log for the sending and/or installation of the software update. The log may include a time stamp.

Method 80 may end at 99.

In client systems 20 with a large number of nodes 32, traditional methods of maintenance would require client system 20 to be serviced at a secure maintenance location. Remote maintenance by radio transmission and/or another over-the-air system may decrease security under those traditional methods.

In contrast, electronic networks 1 employing method 80 may allow the use of remote maintenance without decreasing security. Particular embodiments of electronic network 1 may increase the security of any particular VM 22 by managing the VMs 22 with VMM 24, where data exchange between the various VMs 22 may be operated and/or controlled by VMM 24.

Figure 6:
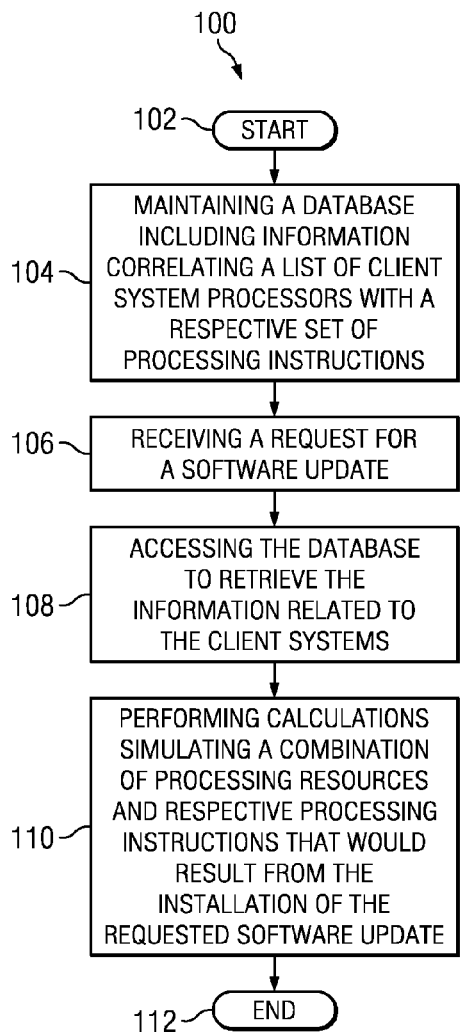

FIG. 6 illustrates a flow chart of an example method 100 for performing remote maintenance in a client system served by an electronic network, in accordance with certain embodiments of the present disclosure. Method 100 may include multiple steps and may be performed by various components of electronic network 1, including data center 10 and/or other resources. In some embodiments, client system 20 may include an automobile and/or an FlexRay system associated with an automobile. Method 100 may start at 102.

Step 104 may include maintaining a database including information correlating a list of client system nodes 32 with a respective set of processing instructions. Data center 10 may perform step 104 alone or in conjunction with other resources. For example, an individual may be responsible for updating the database as new information becomes available. As another example, various vendors and/or suppliers associated with client system nodes 32 may deliver updated software and/or firmware packages to data center 10 electronically.

Step 106 may include receiving a request for a software update, the request including an identifier corresponding to a specific client system 20 and a specific set of processing instructions. Data center 10 may perform step 106. Data center may receive the request over network 18.

Step 108 may include accessing the database to retrieve the information related to the client system nodes 32 and the respective set of processing instructions correlated to the associated nodes 32. Data center 10 may perform step 108 based on the received request.

Step 110 may include performing calculations simulating a combination of nodes 32 and respective processing instructions that would result from the installation of the requested software update. Data center 10 may perform step 110.

Method 100 may end at 112.

In some embodiments, client systems 20 may include a complex network system comprising multiple nodes 32 (e.g., CPUs and/or processing resources). Each node 32 may include associated software and/or firmware supplied by the vendor. As any particular node 32 receives updated software and/or firmware from its respective vendor, a new combination of software and/or firmware exists for client system 20. The number of possible combinations may be very large. An inoperative and/or inappropriate combination of software and/or firmware may affect the operation of client system 20. In some embodiments, data center 10 may maintain a database of nodes 32 and their respective software.

Method 100 may allow data center 10 and/or additional components of electronic network 1 to simulate a proposed combination of nodes 32 and/or their associated software and/or firmware before delivering any electronic content to client system 20. Testing a proposed combination for operational integrity, compatibility, and/or any other appropriate standard may increase the reliability and/or stability of client system 20.

Figure 7:
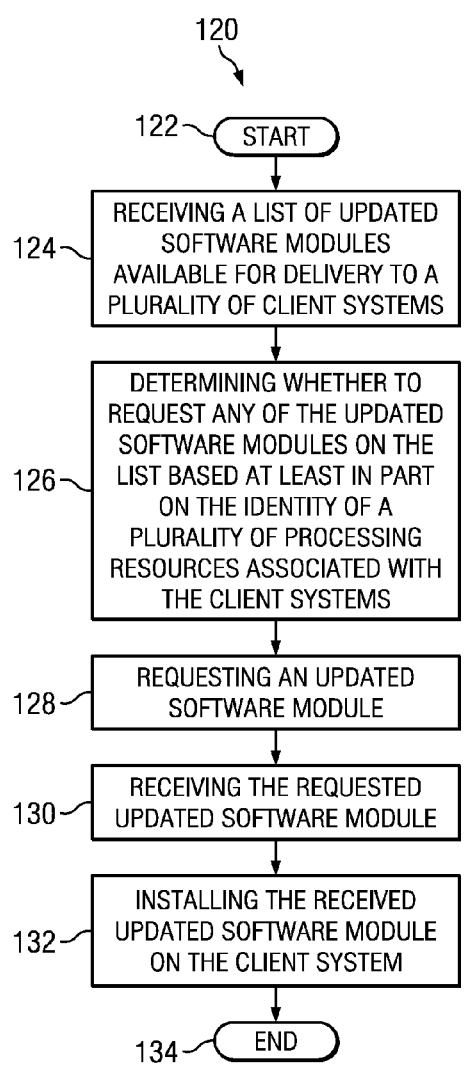

FIG. 7 illustrates a flow chart of an example method 120 for performing remote maintenance on client system 20 served by an electronic network 1 serving a plurality of clients 20, in accordance with certain embodiments of the present disclosure. Method 120 may include multiple steps and may be performed by various components of electronic network 1, including client system 20 and/or other resources. In some embodiments, client system 20 may include an automobile and/or an FlexRay system associated with an automobile. Method 120 may start at 122.

Step 124 may include receiving a list of updated software modules available for delivery to the plurality of client systems 20. The updated software modules may be hosted on plurality of servers. Step 124 may be performed by client system 20. For example, first VM 22*b* may query data center 10 for the list and then receive the list.

Step 126 may include determining whether to request any of the updated software modules on the list based at least in part on the identity of a plurality of nodes 32 associated with client system 20. In some embodiments, first VM 22*b* may consider the list of processors in client system 20 and compare that list versus the list of available modules. For example, if client system 20 is an automobile and/or a FlexRay system associated with an automobile, first VM 22*b* may determine whether to request an update based on the make, model, and/or year of the automobile.

Step 128 may include requesting an updated software module. In some embodiments, step 128 may be an over-the-air and/or a remote communication. Client system 20 may perform step 128. For example, first VM 22*b* may request the updated software module from data center 10.

Step 130 may include receiving the requested updated software module. In some embodiments, the updated software modules may be hosted on a plurality of servers. In such embodiments, client system 20 may receive the requested module from the particular server hosting the requested module. In such embodiments, the list of updated software modules may include a uniform resource locator identifying the location of each module.

Step 132 may include installing the received updated software module on the client system. The updated software module may be delivered over-the-air and/or by another remote communication system. Method 120 may end at 134.

Figure 8:
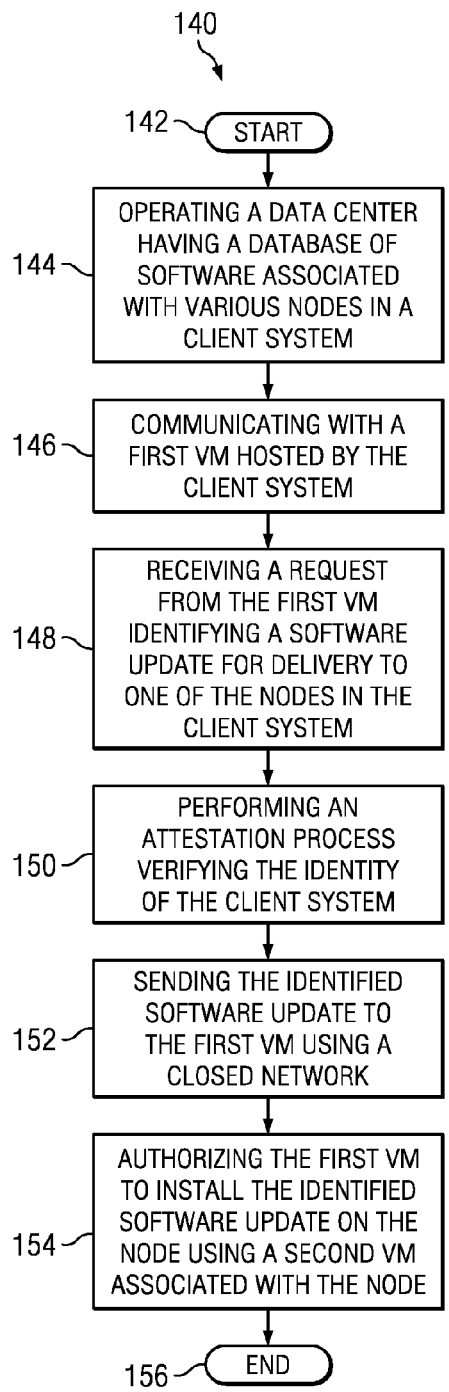

FIG. 8 illustrates a flow chart of an example method 140 for performing remote maintenance in an electronic network 1 configured to serve a plurality of client systems 20 in accordance with certain embodiments of the present disclosure. Method 140 may include multiple steps and may be performed by various components of electronic network 1, including data center 10 and/or other resources. In some embodiments, client system 20 may include a mobile phone. Method 140 may start at 142.

Step 144 may include operating data center 10 having a database of software associated with various nodes 32 in a client system. In embodiments where client system 20 includes a mobile phone, nodes 32 may include various software identifier modules (SIMs). Data center 10 may perform step 144.

Step 146 may include communicating with first virtual machine 22*b* hosted by client system 20. First virtual machine 22*b* may handle a first data set associated with data center 10. For example, first virtual machine 22*b* may be configured to access a list of various configurations, revision numbers, etc. related to the various nodes 32 of client system 20. Data center 10 may perform step 146 using network 18. Data center 10 may compare the data set associated with first VM 22*b* to a list of current versions and/or update status and flag any variations in identity.

Step 148 may include receiving a request first virtual machine 22*b* identifying a software update for delivery to one of the various nodes 32 in client system 20. For example, first VM 22*b* may request a software update for a particular SIM in a mobile phone. Data center 10 may perform step 148.

Step 150 may include performing an attestation process verifying the identity of client system 20. Data center 10 may perform step 150. An attestation process may include any of the verification processes discussed above. In some embodiments, an attestation process may include receiving, testing, and/or verifying one or more biometric indicators. In some embodiments, client system 20 may perform the attestation process to verify the identity of data center 10 using second VM 22b, TPM 24, and/or resource list 28.

Step 152 may include sending the identified software update to the first virtual machine using a network. In some embodiments, data center 10 may send the identified software over network 18. In some embodiments, step 152 may be performed by sending the identified software update wireless and/or over-the-air.

Step 154 may include authorizing first VM 22b to install the received software update on client system 20 using a second VM 22c associated with the one of the various nodes 32. First VM 22b and second VM 22c may communicate through VMM 24. In some embodiments, client system 20 may perform an attestation process verifying the integrity and/or safety of the received software before accepting it from data center 10. Method 140 may end at 156. Attestation may occur before and/or after the installation of the received software update.

In some embodiments, first 22b may interrogate second VM 22c to verify client system 20 has received the software update. In some client systems 20, each of multiple nodes 32 may operate with a unique operating system. For example, in a mobile phone with multiple SIM cards, each SIM card may operate on its own OS. Data exchange between multiple SIM cards and/or between various VMs 22 of client system 20 may be complicated because of the variation in OS. In some embodiments, a particular SIM card may have lower level security requirements in comparison with another SIM care and its OS. In such embodiments, traditional maintenance requires the client system 20 to be serviced in a secure maintenance location.

Use of method 140 and the teachings of the present disclosure may allow over-the-air and/or wireless maintenance of client system 20. In client systems with multiple VMs 22 linked through VMM 24, data exchange between data center 10 and client system 20 may be supported by TPM 26 and provide increased security and/or reliability.

Figure 9:
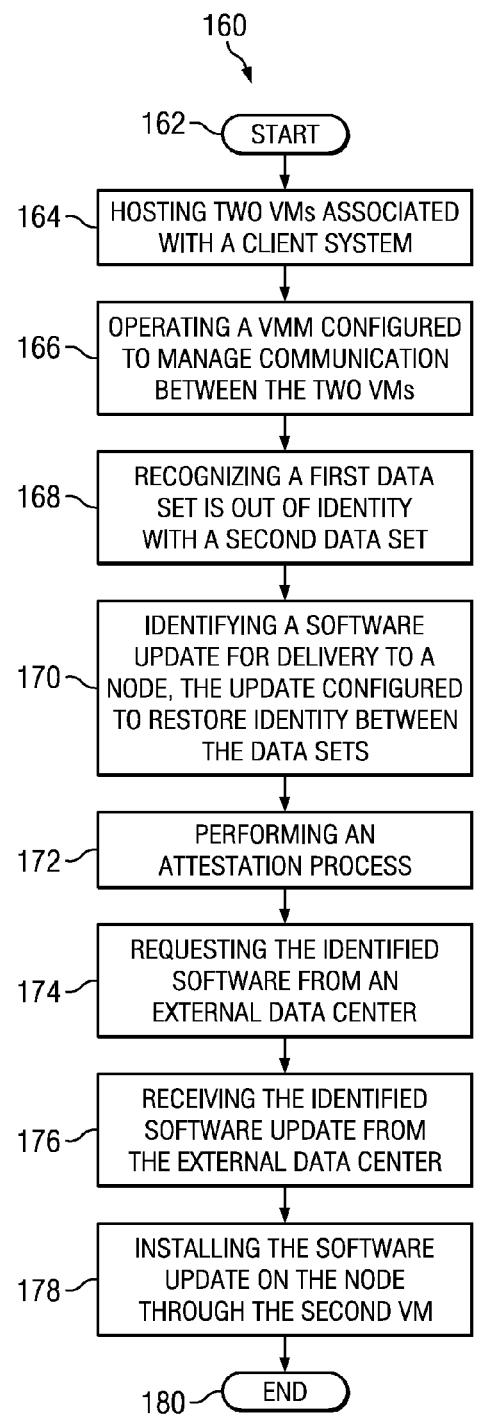

FIG. 9 illustrates a flow chart of an example method 160 for client system 20 to request and receive software updates from a remote server 10, in accordance with certain embodiments of the present disclosure. Method 160 may include multiple steps and may be performed by various components of electronic network 1, including client system 20 and/or other resources. In some embodiments, client system 20 may include a mobile phone. Node 32 may comprise a subscriber identity module (SIM) card. Method 160 may start at 162.

Step 144 may include hosting two virtual machines 22 associated with the client system 20. First VM 22b may handle a first data set associated with external data center 10. Second VM 22c may handle a second data set associated with node 32 in client system 10. First VM 22b and second VM 22c may communicate through VMM 24 to maintain data integrity and/or reliability for the various VMs 22.

Step 146 may include operating VMM 24 configured to manage communication between the two VMs. Client system 20 may perform step 146 in combination with TPM 26.

Step 148 may include recognizing the first data set is out of identity with the second data set. Data center 10, VM 22b or 22c, and/or VMM 24 may perform step 148.

Step 150 may include identifying a software update for delivery to node 32, the software update configured to restore identity between the first data set and the second data set.

Step 152 may include performing an attestation process verifying the identity of the client system, verifying the identity of the data center 10, and/or the reliability and/or safety of the software update identified. Any portion of electronic network 1 may perform the attestation process. For example, VMM 24 may operate in conjunction with TPM 26 to validate the identity of the software package and/or data center 10.

Step 154 may include requesting the identified software update from external data center 10. First VM 22b may perform step 154.

Step 156 may include receiving the identified software update from external data center 10 to first VM 22b.

Step 158 may include installing the sent software update on node 32 through second VM 22c. In some embodiments, first 22b may interrogate second VM 22c to verify node 32 has received the software update.

In some client systems 20, each of multiple nodes 32 may operate with a unique operating system. For example, in a mobile phone with multiple SIM cards, each SIM card may operate on its own OS. Data exchange between multiple SIM cards and/or between various VMs 22 of client system 20 may be complicated because of the variation in OS. In some embodiments, a particular SIM card may have lower level security requirements in comparison with another SIM care and its OS. In such embodiments, traditional maintenance requires the client system 20 to be serviced in a secure maintenance location.

Use of method 160 and the teachings of the present disclosure may allow over-the-air and/or wireless maintenance of client system 20. In client systems with multiple VMs 22 linked through VMM 24, data exchange between data center 10 and client system 20 may be supported by TPM 26 and provide increased security and/or reliability.

Figure 10:
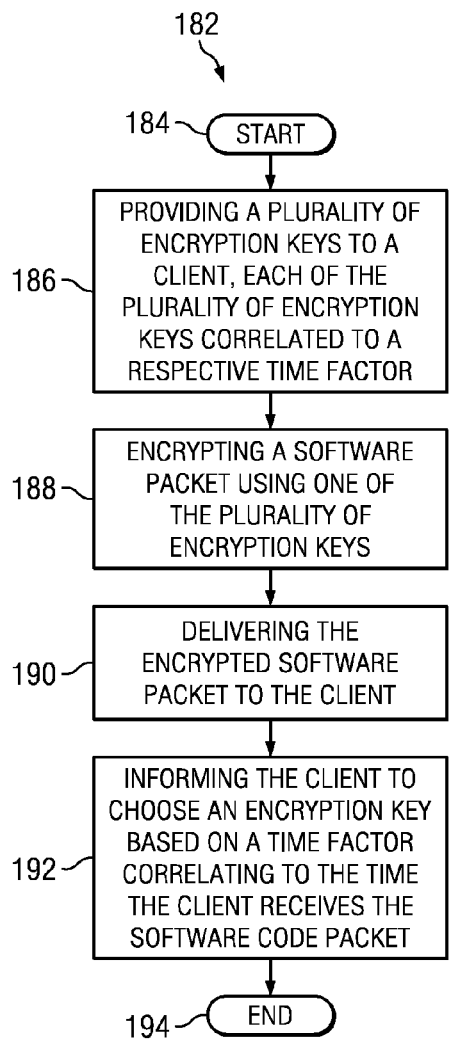

FIG. 10 illustrates a flow chart of an example method 182 for verifying electronic software code integrity, in accordance with certain embodiments of the present disclosure. Method 182 may include multiple steps and may be performed by various components of electronic network 1, including client system 20 and/or other resources. Method 182 may start at 184.

Step 186 may include providing a plurality of encryption keys to client system 20, each of the plurality of encryption keys correlated to a respective time factor. The time factor may depend at least in part on a control factor and a time stamp generated at the delivery of the software code packet, an update timing of the software code packet, or an update timing of a trusted protocol module associated with the client.

Step 188 may include encrypting a software code packet using one of the plurality of encryption keys based on a time factor related to the software code packet.

Step 190 may include delivering the encrypted software code packet to client system 20.

Step 192 may include informing client 20 to choose a decryption key based on the time factor correlating to the time client 20 receives the software code packet. Method 182 may end at 194.

Traditional software code integrity may be checked using an electronic signature (e.g., a public key infrastructure (PKI) certification method). Use of an electronic signature, however, may be unreliable compared to the methods of this disclosure. For example, electronic signatures may incorporate an expiration date, after which the signature will fail. It may be possible to replace and/or change code before and/or after the electronic signature validation process is performed.

In accordance with the teachings of the present disclosure, code integrity may be substantially improved by including an update timing/key control. The encryption key may change based on a time factor. For example, the time factor may depend at least in part on a time stamp related to the sending and/or the delivery of electronic content. As another example, the time factor may depend at least in part on the update timing of TPM 26 and/or a VM 22. In any case, the time factor may also depend on a pre-arranged control factor, α. Multiple encryption keys may be stored by resource list 28 associated with TPM 26. Using the appropriate encryption key, TPM 26 may also check the expiration of the electronic content using its electronic signature date.

Figure 11:
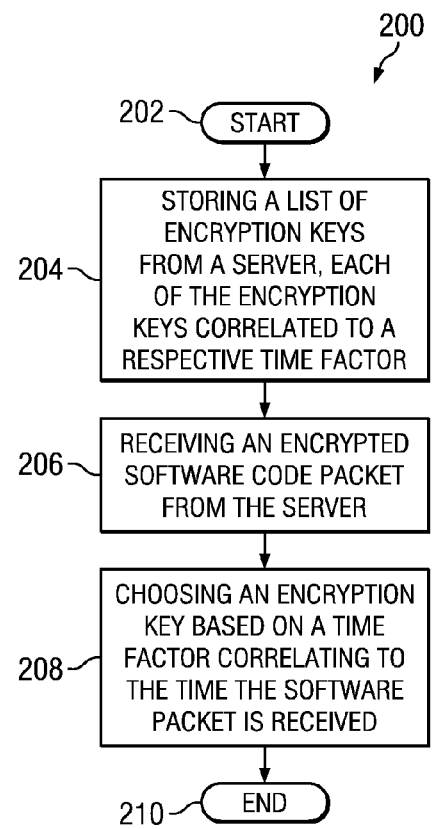

FIG. 11 illustrates a flow chart of an example method 200 for verifying electronic software code integrity, in accordance with certain embodiments of the present disclosure. Method 200 may include multiple steps and may be performed by various components of electronic network 1, including client system 20 and/or other resources. Method 200 may start at 202.

In accordance with the teachings of the present disclosure, code integrity may be substantially improved by including an update timing/key control. The encryption key may change based on a time factor. For example, the time factor may depend at least in part on a time stamp related to the sending and/or the delivery of electronic content. As another example, the time factor may depend at least in part on the update timing of TPM 26 and/or a VM 22. In any case, the time factor may also depend on a pre-arranged control factor, α. Multiple encryption keys may be stored by resource list 28 associated with TPM 26. Using the appropriate encryption key, TPM 26 may also check the expiration of the electronic content using its electronic signature date.

Step 204 may include storing a list of encryption keys from data center 10, each of the encryption keys correlated to a respective time factor. The list may be stored by TPM 24 and/or by a storage resource associated with TPM 24.

Step 206 may include receiving an encrypted software code packet from data center 10. In some embodiments, an electronic signature may also be received.

Step 208 may include choosing an encryption key based on a time factor. In some embodiments, TPM 24 may also check an electronic signature delivered with the encrypted software packet. Method 200 may end at 210.

Although FIGS. 4-11 represent a particular number of steps to be taken with respect to methods 60, 80, 100, 120, 140, 160, 184, and 200, the various methods may be executed with more or fewer steps than those depicted. Using the methods and systems disclosed herein, certain problems associated with maintaining secure access to electronic content may be improved, reduced, or eliminated. For example, the methods and system disclosed herein may provide increased security and/or reliability for electronic network performing remote maintenance of client systems.

Although the present invention has been described with several embodiments, various changes and modifications may be suggested to one skilled in the art. It is intended that the present invention encompass such changes and modifications as fall within the scope of the appended claims. The teachings of the present disclosure encompass all changes, substitutions, variations, alterations, modifications to the example embodiments herein that a person having ordinary skill in the art would comprehend.

In particular embodiments, one or more web pages may be associated with a networking system and/or networking service. Particular embodiments may involve the retrieval and/or rendering of structured documents hosted by any type of network addressable resource or web site. Additionally, as used herein, a "user" may include an individual, a group, and/or a corporate entity (e.g., a business and a third party application).

What is claimed is:

1. A client system comprising:
   a plurality of nodes, including a first node storing software for operation of the client system;
   a first virtual machine handling first data associated with an external data center, wherein the first data includes software update data delivered from the external data center to the client system;
   a second virtual machine handling second data associated with the first node, wherein the second data specifies at least one of a status, a version and a configuration of the first node;
   a virtual machine manager configured to manage data transfer between the first virtual machine and the second virtual machine in association with a trusted platform module;
   wherein the first virtual machine is configured to assess a state of the client system and identify a software update for installation on the first node based on a comparison of the first data and the second data, the software update configured to maintain identity between the first data and the second data; and
   wherein the virtual machine manager is configured to conduct an attestation process to verify an identity of the external data center using the trusted platform module prior to authorizing the first virtual machine to install the software update on the first node using the second virtual machine.

2. The client system according to claim 1, wherein the client system is a mobile phone.

3. The client system according to claim 2, wherein the first node comprises a subscriber identity module (SIM) card.

4. The client system according to claim 1, wherein the software update is delivered wirelessly to the client system.

5. The client system according to claim 1, wherein the first virtual machine interrogates the second virtual machine to verify the first node has received the software update.

6. The client system according to claim 1, further comprising a log stored by the first virtual machine, the log identifying one or more software updates delivered to the client system.

7. The client system according to claim 1, further comprising a log stored by the second virtual machine, the log identifying one or more software updates delivered to the client system.

8. The client system according to claim 1, further comprising a log stored by the second virtual machine, the log identifying one or more software updates delivered to the client system and the log including a time-stamp associated with each software update.

9. The client system according to claim 1, wherein delivery of the software update is controlled based on registered information associated with the client system.

10. The client system according to claim 1, wherein delivery of the software update is controlled based on sensor data collected by a sensor in the client system.

11. An electronic network comprising:
    a client system having a plurality of nodes, including a first node storing software for operation of the client system;
    an external data center managing the first node;
    a first virtual machine on the client system, the first virtual machine handling first data associated with the external data center, wherein the first data includes software update data delivered from the external data center to the client system;

a second virtual machine on the client system, the second virtual machine handling second data associated with the first node, wherein the second data specifies at least one of a status, a version and a configuration of the first node; and a virtual machine manager on the client system configured to manage data transfer between the first virtual machine and the second virtual machine in association with a trusted platform module;

wherein the first virtual machine is configured to assess a state of the client system and identify a software update for installation from the external data center on the first node based on a comparison of the first data and the second data, the software update configured to maintain identity between the first data and the second data; and wherein the virtual machine manager is configured to complete an attestation process to verify an identity of the external data center using the trusted platform module prior authorizing the first virtual machine to install the software update on the first node using the second virtual machine.

12. The electronic network according to claim 11, wherein the client system is a mobile phone.

13. The electronic network according to claim 12, wherein the first node comprises a subscriber identity module (SIM) card.

14. The electronic network according to claim 11, wherein the software update is delivered wirelessly to the client system.

15. The electronic network according to claim 11, wherein the first virtual machine interrogates the second virtual machine to verify the first node has received the software update.

16. The electronic network according to claim 11, further comprising a log stored by the first virtual machine, the log identifying one or more software updates delivered to the client system.

17. The electronic network according to claim 11, further comprising a log stored by the second virtual machine, the log identifying one or more software updates delivered to the client system.

18. The electronic network according to claim 11, further comprising a log stored by the second virtual machine, the log identifying one or more software updates delivered to the client system and the log including a time-stamp associated with each software update.

19. A method of performing remote maintenance in an electronic network configured to serve a plurality of client systems, the method comprising:

operating a data center having a database of software associated with a plurality of nodes in a client system, including a first node storing software for operation of the client system;

communicating with a first virtual machine hosted by the client system, the first virtual machine handling a first data set associated with the data center, wherein the first data set includes software update data delivered from the external data center to the client system;

receiving a request from the first virtual machine identifying a software update for delivery to the first node;

sending the software update to the first virtual machine using a closed network;

authorizing the first virtual machine to install the software update on the client system using a second virtual machine associated with the first node, wherein the second virtual machine handles second data specifying at least one of a status, a version and a configuration of the first node; and the first virtual machine and the second virtual machine communicating through a virtual machine manager on the client system in association with a trusted platform module, wherein the virtual machine manager is configured to complete an attestation process to verify an identity of the data center using the trusted platform module prior authorizing the first virtual machine to install the software update on the first node using the second virtual machine.

20. The method according to claim 19, wherein the client system is a mobile phone.

21. The method according to claim 19, wherein the first node comprises a subscriber identity module (SIM) card.

22. The method according to claim 19, wherein the software update is delivered wirelessly to the client system.

23. The method according to claim 19, wherein the first virtual machine operates to interrogate the second virtual machine to verify the client system has received the software update.

24. A method of requesting and receiving software updates, the method comprising:

hosting a first virtual machine and a second virtual machine on a client system;

the first virtual machine handling a first data set associated with an external data center, wherein the first data set includes software update data delivered from the external data center to the client system;

the second virtual machine handling a second data set associated with a node in the client system wherein the second data set specifies at least one of a status, a version and a configuration of the node;

operating a virtual machine manager configured to manage communication between the first virtual machine and the second virtual machine in association with a trusted platform module;

recognizing the first data set is out of identity with the second data set;

identifying a software update for delivery to the node, the software update configured to restore identity between the first data set and the second data set;

requesting the software update from the external data center;

receiving the software update from the external data center to the first virtual machine;

after receiving the software update, installing the software update on the node by the second virtual machine;

the first virtual machine and the second virtual machine communicating through a virtual machine manager on the client system in association with a trusted platform module, wherein the virtual machine manager is configured to complete an attestation process to verify an identity of the external data center using the trusted platform module prior authorizing the first virtual machine to install the software update on the first node using the second virtual machine.

25. The method according to claim 24, wherein the client system comprises a mobile phone and the node comprises a subscriber identity module (SIM) card.

* * * * *